United States Patent
Sewall et al.

(10) Patent No.: US 8,139,433 B2
(45) Date of Patent: Mar. 20, 2012

(54) MEMORY DEVICE CONTROL FOR SELF-REFRESH MODE

(75) Inventors: Jeremy Sewall, Tokyo (JP); Eric D. Persson, Tokyo (JP)

(73) Assignee: LSI Corporation, Milpitas, CA (US)

( * ) Notice: Subject to any disclaimer, the term of this patent is extended or adjusted under 35 U.S.C. 154(b) by 332 days.

(21) Appl. No.: 12/464,950

(22) Filed: May 13, 2009

(65) Prior Publication Data

US 2010/0293326 A1    Nov. 18, 2010

(51) Int. Cl.
*G06F 12/00* (2006.01)
*G06F 1/04* (2006.01)
*G06F 1/32* (2006.01)
*G11C 7/00* (2006.01)

(52) U.S. Cl. . 365/222; 365/226; 711/106; 711/E12.001; 713/600; 713/324

(58) Field of Classification Search .................. 365/222, 365/226, 228, 229
See application file for complete search history.

(56) References Cited

U.S. PATENT DOCUMENTS

| | | | |
|---|---|---|---|
| 5,831,467 A | 11/1998 | Leung et al. | |
| 6,564,329 B1 | 5/2003 | Cheung et al. | |
| 6,917,546 B2 | 7/2005 | Matsui | |
| 6,928,007 B2 | 8/2005 | Jin | |
| 7,039,755 B1 * | 5/2006 | Helms | 711/106 |
| 7,164,611 B2 | 1/2007 | Kinsley | |
| 7,196,966 B2 | 3/2007 | Jin | |
| 7,348,819 B2 | 3/2008 | Choi | |
| 7,715,264 B2 | 5/2010 | Meyer et al. | |
| 7,729,191 B2 | 6/2010 | Smith et al. | |
| 7,786,752 B2 | 8/2010 | Oh et al. | |
| 2002/0144166 A1 | 10/2002 | Chang et al. | |
| 2006/0047985 A1 | 3/2006 | Otani | |
| 2006/0149857 A1 * | 7/2006 | Holman | 710/3 |
| 2006/0248355 A1 * | 11/2006 | Thayer | 713/300 |
| 2008/0031073 A1 | 2/2008 | Brandt | |

\* cited by examiner

*Primary Examiner* — Hoai V Ho
*Assistant Examiner* — Tri Hoang
(74) *Attorney, Agent, or Firm* — Mendelsohn, Drucker & Associates, P.C.; Steve Mendelsohn

(57) ABSTRACT

To ensure that a memory device operates in self-refresh mode, the memory controller includes (1) a normal-mode output buffer for driving a clock enable signal CKE onto the memory device's CKE input and (2) a power island for driving a clock enable signal CKE_prime onto that same input. To power down the memory controller, the normal-mode output buffer drives signal CKE low, then the power island drives signal CKE_prime low, then the memory controller (except for the power island) is powered down. The power island continues to drive the memory device's CKE input low to ensure that the memory device stays in self-refresh mode while the memory controller is powered substantially off. To resume normal operations, the power module powers up the memory controller, then the normal-mode output buffer drives signal CKE low, then the power island is disabled, then the memory controller resumes normal operations of the memory device.

14 Claims, 1 Drawing Sheet

MEMORY DEVICE CONTROL FOR SELF-REFRESH MODE

BACKGROUND OF THE INVENTION

1. Field of the Invention

The present invention relates to electronics, and, in particular, to memory devices having self-refresh modes.

2. Description of the Related Art

In typical computer hardware architectures, an integrated circuit (IC) memory device chip is controlled by a separate IC memory controller chip that controls the writing of data to and the reading of data from the memory device during normal operations of the memory device. Some memory devices are capable of operating in a self-refresh mode in which the memory device maintains its stored data without any active command from the memory controller, such as when the memory controller is powered off.

For some memory devices, such as DDR1 and DDR2 registered dual in-line memory modules (RDIMMs) defined by Joint Electron Device Engineering Council (JEDEC) standards JESD79F and JESD79-2E, respectively, where DDR stands for "double data rate," the memory device's RESET signal can be used to keep the memory device in self-refresh mode by holding the memory device's clock enable (CKE) line low while allowing the memory controller to be powered down. For other memory devices, such as DDR3 RDIMM memory devices defined by JEDEC standard JESD79-3C, asserting the RESET signal takes the memory device out of self-refresh mode. As such, when the memory controller is powered off, the RESET signal cannot be used to keep the memory device in self-refresh mode, thereby jeopardizing the integrity of the data stored in the memory device.

SUMMARY OF THE INVENTION

In one embodiment, the present invention is apparatus comprising a memory controller for controlling a memory device having a clock enable (CKE) input. The memory controller comprises first circuitry and second circuitry. The first circuitry is adapted to apply a first CKE signal to the CKE input during a normal operating mode. The second circuitry is adapted to apply a second CKE signal to the CKE input during a self-refresh operating mode. During the self-refresh operating mode, (i) the first circuitry is powered off and (ii) the second circuitry is powered on to drive the second CKE signal to a self-refresh signal level for the memory device.

In another embodiment, the present invention is a method for controlling a memory device having a clock enable (CKE) input. The method comprises (a) using first circuitry to apply a first CKE signal to the CKE input during a normal operating mode and (b) using second circuitry to apply a second CKE signal to the CKE input during a self-refresh operating mode. During the self-refresh operating mode, (i) the first circuitry is powered off and (ii) the second circuitry is powered on to drive the second CKE signal to a self-refresh signal level for the memory device.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
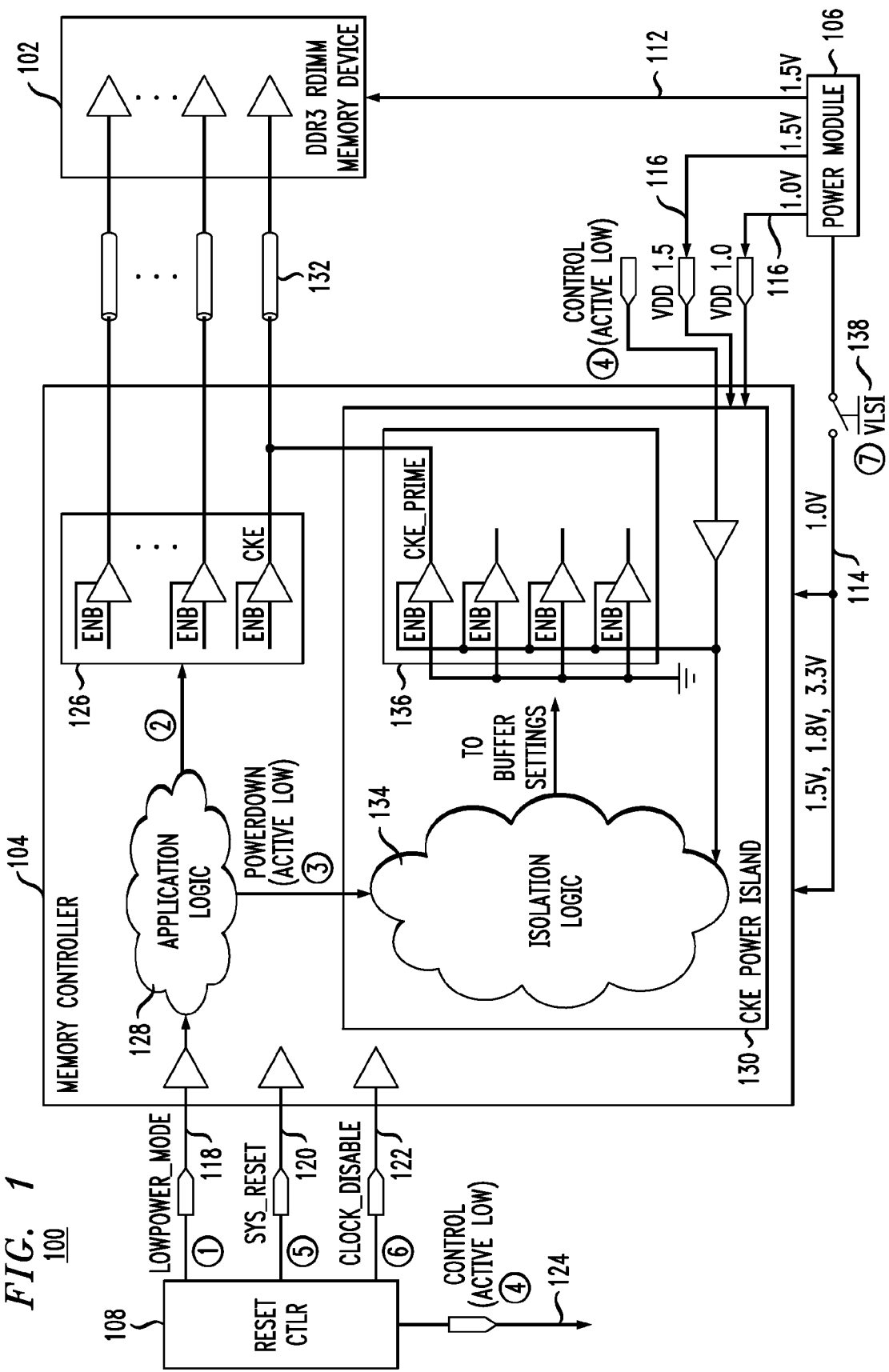
FIG. 1 shows a simplified block diagram of memory circuitry 100, according to one embodiment of the present invention.

As used in this specification, the term "powered off" refers to a state of an integrated circuit (IC) chip in which no power is applied to the chip. The term "powered on" refers to a state in which power is applied to the chip. The term "powering up" refers to a transition from the powered-off state to the powered-on state, while the term "powering down" refers to a transition from the powered-on state to the powered-off state.

FIG. 1 shows a simplified block diagram of memory circuitry 100, according to one embodiment of the present invention. Memory circuitry 100 includes DDR3 RDIMM memory device 102, memory controller 104, power module 106, and reset controller 108. Memory controller 104 controls the writing of data to and the reading of data from memory device 102. Power module 106 provides power to memory device 102 via power lines 112 and to memory controller 104 via main power lines 114 and backup power lines 116. Reset controller 108 controls the operations of memory controller 104 via control lines 118-124.

In addition to other circuitry not shown in FIG. 1, memory controller 104 includes output buffers 126, application logic 128, and CKE power island 130. Application logic 128 controls the operations of output buffers 126, which drive signals into memory device 102, including clock enable signal CKE via signal line 132 at the memory devices CKE input. CKE power island 130 includes isolation logic 134 and output buffers 136. Isolation logic 134 controls the operations of output buffers 136, whose outputs are connected to the same signal lines as the outputs of output buffers 126, including clock enable signal CKE_prime, which is connected to the same signal line 132 that receives the CKE signal from a corresponding one of output buffers 126. Note that, in general, connections could be made on the die or in the package routing. In general, the corresponding buffer 126 can be used to drive the CKE signal onto signal line 132, when the corresponding buffer 136 is disabled, and vice versa. In addition, both corresponding buffers can be used simultaneously to drive equivalent output signals (i.e., the CKE and CKE_prime signals both high or both low) onto signal line 132.

Although FIG. 1 shows memory circuitry 100 having separate components, in general, two or more of those components may be implemented in a single integrated system-on-a-chip (SOC).

Memory circuitry 100 supports two different modes of operation: normal operating mode and self-refresh operating mode. During the normal operating mode:
  Memory device 102 and memory controller 104 are both fully powered on;
  Application logic 128 controls the operations of output buffers 126 to drive appropriate signals into memory device 102. For example and in particular, in order for memory controller 104 to be able to write data to and read data from memory device 102 during the normal operating mode, application logic 128 controls output buffers 126 to toggle the CKE signal on signal line 132; and
  Reset controller 108 and isolation logic 134 ensure that output buffers 136 are disabled.
During the Self-Refresh Operating Mode:
  Memory device 102 is fully powered on;
  Most but not all of memory controller 104 is powered off. For example and in particular, output buffers 126 and application logic 128 are powered off, while CKE power island 130 remains powered on; and Reset controller 108 and isolation logic 134 control the operations of output buffers 136 to drive appropriate signals into memory device 102. For example and in particular, in order for memory device 102 to remain in its self-refresh mode, output buffers 136 are controlled to drive the CKE_prime signal low on signal line 132.

FIG. 1 indicates, via circled reference numbers, the sequence of operations to transition memory circuitry 100 from its normal operating mode into its self-refresh operating mode, and vice versa. In particular, memory circuitry 100 can be transitioned from its normal operating mode into its self-refresh operating mode (i.e., a power-down transition) by the following sequence of events:

(1) Transition is initiated by a system-level event, resulting in reset controller 108 asserting low-power-mode signal LOWPOWER_MODE on control line 118.

(2) In response to the assertion of the LOWPOWER_MODE signal, application logic 128 controls output drivers 126 to place memory device 102 into its self-refresh mode, including driving the CKE signal low on signal line 132.

(3) Application logic 128 activates CKE power island 130.

(4) Reset controller 108 enables output drivers 136 via control line 124, which results in isolation logic 134 controlling output drivers 136 to drive the CKE_prime signal low on signal line 132. Note that, at this time, both corresponding output drivers 126 and 136 simultaneously drive signal line 132 low.

(5) Reset controller 108 asserts system-reset signal SYS_RESET via control line 120. Asserting the SYS_RESET signal causes application logic 128 to place output buffers 126 into their initial state to ensure that output buffers 126 drive the CKE signal low.

(6) Reset controller 108 asserts clock-disable signal CLOCK_DISABLE via control line 122 to disable the clocks (not shown) in memory controller 104.

(7) Reset controller 108 opens switch 138 to switch off power from power module 106 to memory controller 104 via main power lines 114, which powers down most of memory controller 104, including output buffers 126 and application logic 128. Note that power module 106 continues to provide power to memory device 102 via power lines 112 and to CKE power island 130 via backup power lines 116, such that isolation logic 134 controls output buffers 136 to drive the CKE_prime signal low to enable memory device 102 to remain in its self-refresh mode.

Note that the seven steps involved in the power-down transition may be implemented in a different order. For example, the order of steps (2) and (3) can be reversed. Note further that some of the steps may be optional. For example, step (5) is provided as a safety measure, but may be omitted in light of step (2).

In addition, referring to the same circled reference numbers in FIG. 1, but in descending order (with the exception of steps (1) and (2)), memory circuitry 100 can be transitioned from its self-refresh operating mode back into its normal operating mode (i.e., a power-up transition) by the following sequence of events:

(7) Reset controller 108 closes switch 138 to switch back on power from power module 106 to memory controller 104 via main power lines 114, which fully powers up memory controller 104, including output buffers 126 and application logic 128. Note that power module 106 continues to provide power to memory device 102 via power lines 112 and to CKE power island 130 via backup power lines 116, such that isolation logic 134 controls output buffers 136 to continue to drive the CKE_prime signal low to enable memory device 102 to remain in its self-refresh mode.

(6) Reset controller 108 de-asserts clock-disable signal CLOCK_DISABLE via control line 122 to re-enable the clocks (not shown) in memory controller 104.

(5) Reset controller 108 de-asserts system-reset signal SYS_RESET via control line 120. De-asserting the SYS_RESET signal causes application logic 128 to re-initialize output buffers 126 for resumption of normal operations. Note that, at initialization, output buffers 126 drive the CKE signal low. At this time, both corresponding output drivers 126 and 136 simultaneously drive signal line 132 low.

(4) Reset controller 108 disables output drivers 136 via control line 124.

(3) Application logic 128 deactivates CKE power island 130.

(1) Reset controller 108 de-asserts the LOWPOWER_MODE signal via control line 118.

(2) In response to the de-assertion of the LOWPOWER_MODE signal, application logic 128 controls output drivers 126 to release memory device 102 from its self-refresh mode for resumption of normal operations, including driving the CKE signal as needed.

Note that, here, too, the seven steps involved in the power-up transition may be implemented in a different order. For example, the order of step (3) can be implemented after steps (1) and (2).

Memory circuitry 100 enables memory controller 104 to be substantially powered down while maintaining the integrity of the data stored in memory device 102.

In one implementation, each of elements 102-108 of FIG. 1 is a discrete electronic module mounted on a circuit board and interconnected via suitable board traces. Memory controller 104 may be part of a larger integrated circuit module that provides, in addition to the control of memory device 102, other functions related to other system elements not shown in FIG. 1. Similarly, power module 106 may provide power to other system elements not shown in FIG. 1, including other memory devices.

Although the present invention has been described in the context of memory circuitry 100 of FIG. 1 having a single DDR3 RDIMM memory device, it will be understood that, in general, the present invention can be implemented for any suitable type of memory topology having one or more memory devices, where those memory devices can be RDIMMs, such as DDR1, DDR2, or DDR3 RDIMMs, or other suitable on-board devices.

The present invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required.

Conversely, the terms "directly coupled," "directly connected," etc., imply the absence of such additional elements.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

What is claimed is:

1. Apparatus comprising a memory controller for controlling a memory device having a clock enable (CKE) input, the memory controller comprising:
    first circuitry adapted to apply a first CKE signal to the CKE input during a normal operating mode; and
    second circuitry adapted to apply a second CKE signal to the CKE input during a self-refresh operating mode, wherein, during the self-refresh operating mode:
    the first circuitry is powered off; and
    the second circuitry is powered on to drive the second CKE signal to a self-refresh signal level for the memory device, wherein:
    the first circuitry comprises (i) a first output buffer connected to drive the first CKE signal to the CKE input and (ii) first logic circuitry connected to control operations of the first output buffer;
    the second circuitry comprises (i) a second output buffer connected to drive the second CKE signal to the CKE input and (ii) second logic circuitry connected to control operations of the second output buffer; and
    the memory controller is adapted to support a power-down transition from the normal operating mode to the self-refresh operating mode, wherein:
    before the power-down transition:
        the first circuitry is powered on;
        the first logic circuitry controls the first output buffer to drive the CKE input for the normal operating mode; and
        the second output buffer is disabled;
    during the power-down transition:
        (1) the first logic circuitry controls the first output buffer to drive the CKE input to the self-refresh signal level;
        (2) the second logic circuitry then enables and controls the second output buffer to drive the CKE input to the self-refresh signal level in parallel with the first output buffer driving the CKE input to the self-refresh signal level; and
        (3) the first circuitry is then powered down; and
    after the power-down transition:
        the first circuitry is powered off;
        the second circuitry is powered on; and
        the second logic circuitry controls the second output buffer to drive the CKE input to the self-refresh signal level.

2. The invention of claim 1, wherein the memory controller is a single integrated circuit comprising the first circuitry and the second circuitry, wherein the second circuitry is a power island within the single integrated circuit.

3. The invention of claim 1, wherein:
    the CKE input is adapted to be selectively driven high or low;
    for the self-refresh operating mode, the CKE input needs to be driven low;
    the self-refresh signal level for the memory device is low; and
    the second circuitry is adapted to drive the CKE input low during the self-refresh operating mode.

4. The invention of claim 1, wherein the memory controller is adapted to support a power-up transition from the self-refresh operating mode to the normal operating mode, wherein:
    before the power-up transition:
        the first circuitry is powered off;
        the second circuitry is powered on; and
        the second logic circuitry controls the second output buffer to drive the CKE input to the self-refresh signal level;
    during the power-up transition:
        (1) the first circuitry is powered up with the first output buffer disabled;
        (2) the first logic circuitry then enables and controls the first output buffer to drive the CKE input to the self-refresh signal level in parallel with the second output buffer driving the CKE input to the self-refresh signal level; and
        (3) the second output buffer is disabled; and
    after the power-up transition:
        the first circuitry is powered on;
        the first logic circuitry controls the first output buffer to drive the CKE input for the normal operating mode; and
        the second output buffer is disabled.

5. The invention of claim 1, wherein the apparatus further comprises the memory device.

6. The invention of claim 5, wherein the apparatus further comprises (i) a power module connected to provide power to the first circuitry, the second circuitry, and the memory device and (ii) a reset controller connected to control operations of the memory controller.

7. The invention of claim 1, wherein the memory device is a registered dual in-line memory module (RDIMM).

8. The invention of claim 7, wherein the RDIMM memory device is a double-data-rate three (DDR3) RDIMM memory device.

9. A method for controlling a memory device having a clock enable (CKE) input, the method comprising:

using first circuitry to apply a first CKE signal to the CKE input during a normal operating mode; and
using second circuitry to apply a second CKE signal to the CKE input during a self-refresh operating mode, wherein, during the self-refresh operating mode:
the first circuitry is powered off; and
the second circuitry is powered on to drive the second CKE signal to a self-refresh signal level for the memory device, wherein:
the first circuitry comprises (i) a first output buffer connected to drive the first CKE signal to the CKE input and (ii) first logic circuitry connected to control operations of the first output buffer;
the second circuitry comprises (i) a second output buffer connected to drive the second CKE signal to the CKE input and (ii) second logic circuitry connected to control operations of the second output buffer; and
the first and second circuitries support a power-down transition from the normal operating mode to the self-refresh operating mode, wherein:
before the power-down transition:
the first circuitry is powered on;
the first logic circuitry controls the first output buffer to drive the CKE input for the normal operating mode; and
the second output buffer is disabled;
during the power-down transition:
(1) the first logic circuitry controls the first output buffer to drive the CKE input to the self-refresh signal level;
(2) the second logic circuitry then enables and controls the second output buffer to drive the CKE input to the self-refresh signal level in parallel with the first output buffer driving the CKE input to the self-refresh signal level; and
(3) the first circuitry is then powered down; and
after the power-down transition:
the first circuitry is powered off;
the second circuitry is powered on; and
the second logic circuitry controls the second output buffer to drive the CKE input to the self-refresh signal level.

10. The invention of claim 9, wherein the first circuitry and the second circuitry are part of a single integrated circuit, wherein the second circuitry is a power island within the single integrated circuit.

11. The invention of claim 9, wherein:
the CKE input is selectively driven high or low;
for the self-refresh operating mode, the CKE input needs to be driven low;
the self-refresh signal level for the memory device is low; and
the second circuitry drives the CKE input low during the self-refresh operating mode.

12. The invention of claim 9, wherein the first and second circuitries support a power-up transition from the self-refresh operating mode to the normal operating mode, wherein:
before the power-up transition:
the first circuitry is powered off;
the second circuitry is powered on; and
the second logic circuitry controls the second output buffer to drive the CKE input to the self-refresh signal level;
during the power-up transition:
(1) the first circuitry is powered up with the first output buffer disabled;
(2) the first logic circuitry then enables and controls the first output buffer to drive the CKE input to the self-refresh signal level in parallel with the second output buffer driving the CKE input to the self-refresh signal level; and
(3) the second output buffer is disabled; and
after the power-up transition:
the first circuitry is powered on;
the first logic circuitry controls the first output buffer to drive the CKE input for the normal operating mode; and
the second output buffer is disabled.

13. The invention of claim 9, wherein the memory device is a registered dual in-line memory module (RDIMM).

14. The invention of claim 13, wherein the RDIMM memory device is a double-data-rate three (DDR3) RDIMM memory device.

* * * * *